United States Patent [19]

Nishimura et al.

[11] Patent Number: 5,442,883
[45] Date of Patent: Aug. 22, 1995

[54] VIBRATION CONTROL DEVICE FOR STRUCTURE

[75] Inventors: Isao Nishimura; Mitsuo Sakamoto; Katsuyasu Sasaki, all of Tokyo, Japan

[73] Assignee: Kajima Corporation, Tokyo, Japan

[21] Appl. No.: 142,297

[22] PCT Filed: May 29, 1992

[86] PCT No.: PCT/JP92/00704
§ 371 Date: Nov. 18, 1993
§ 102(e) Date: Nov. 18, 1993

[87] PCT Pub. No.: WO92/21840
PCT Pub. Date: Dec. 10, 1992

[30] Foreign Application Priority Data

May 29, 1991 [JP] Japan .................. 3-125741

[51] Int. Cl.6 .................................. E04H 9/02
[52] U.S. Cl. ........................... 52/167.2; 52/1; 52/167.1; 52/167.8
[58] Field of Search ............ 52/1, 167.1, 167.2, 52/167.5, 167.8

[56] References Cited

U.S. PATENT DOCUMENTS

| | | | |
|---|---|---|---|
| 4,807,840 | 2/1989 | Baker et al. | 52/167 DF X |
| 4,841,685 | 6/1989 | Masri et al. | 52/167 DF X |
| 4,924,640 | 5/1990 | Suizu et al. | 52/167 DF |
| 5,005,326 | 4/1991 | Ishimaru et al. | 52/167 DF |
| 5,022,201 | 6/1991 | Kobori et al. | 52/167 DF |
| 5,025,599 | 6/1991 | Ishii et al. | 52/167 DF |
| 5,158,021 | 10/1992 | Matsui et al. | |
| 5,182,887 | 2/1993 | Uno et al. | 52/167 R |

FOREIGN PATENT DOCUMENTS

| | | |
|---|---|---|
| 63-76932 | 4/1988 | Japan . |
| 63-297837 | 12/1988 | Japan . |
| 1-275866 | 6/1989 | Japan . |
| 1-275867 | 6/1989 | Japan . |
| 1-275868 | 6/1989 | Japan . |
| 1-275869 | 6/1989 | Japan . |
| 1-322061 | 12/1989 | Japan .............. 52/167 DF |
| 3-70075 | 6/1991 | Japan . |
| 3-169984 | 7/1991 | Japan . |
| 3-38386 | 10/1991 | Japan . |
| 4-157233 | 5/1992 | Japan . |
| 1418435 | 8/1988 | U.S.S.R. .......... 52/167 DF |

Primary Examiner—Carl D. Friedman
Assistant Examiner—Kevin D. Wilkens
Attorney, Agent, or Firm—James H. Tilberry

[57] ABSTRACT

A device to protect tall buildings from structural damage due to seismic vibration and/or high winds. The device comprises a first mass equal to about 1/500 to 1/1000 of the weight of the building to be protected. The first mass, provided with an upper arcuately concave surface with matching curved tracks, is horizontally secured on rubber dampers to an appropriate portion of the building, such as the roof or an upper floor. A second mass, equal to about 1/20 to 1/100 of the weight of the first mass, is positioned to oscillate on the curved tracks in synchronization with the natural frequency of the building, whereby the response of the building due to seismic vibration or high winds is attenuated. The curved tracks can function as the stator of a linear motor and the second mass can function as the motor driver.

18 Claims, 3 Drawing Sheets

VIBRATION CONTROL DEVICE FOR STRUCTURE

BACKGROUND OF INVENTION

1. Field of Invention The field of invention relates to vibration control devices of the active type for reducing the response of a structure to earthquake and wind vibrations or the like, by applying a control force on the structure. These devices are suitable for vibration control of large scale structures having comparatively long natural periods, such as multi-storied buildings and high rises.

2. Description of Related Art

As used in this specification, symbols and terms are defined as follows:

$c_d$ —coefficient of damping
$h_d$ —damping factor
$k_b$, $k_d$, and $k_1$ —spring coefficients of stiffness
$m_1$ —mass of building structure
$m_a$—first additional mass
$m_b$ —second additional mass
$u(t)$—actuator control force
$x_a$—displacement of first additional mass
$x_b$—displacement of second additional mass
$x_1$—displacement of building structure Active mass damper (AMD)—a mass damper energized solely by a man-made control force such as hydraulic, electromagnetic, electrical, electromechanical means, or any combination thereof.

Passive mass damper (DD)—a mass damper energized solely from the energy of seismic (or wind) vibration.

Dynamic dampers (designated hereinafter as DD) of the passive type are disclosed in Japanese Pat. Laid-open No. 63-76932 and Japanese Pat. Publication No. 3-38386.

Prior art FIG. 6 of this application shows a vibration model of a DD to be applied to a structure, wherein $m_1$ is a mass of a main body of a structure constituting a main vibration system, and $m_d$ is a mass of an additional mass body constituting a damping system. Also, $k_1$ is a spring constant of the main body of the structure. The main body of the structure having a mass $m_1$ and the additional mass body are mutually connected through a spring having a spring constant $k_d$ and a damper having a damping coefficient $c_d$. Further, $x_1$ represents a displacement of the structure, and $x_d$ represents a displacement of the additional mass body $m_d$.

A natural angular frequency of the main vibration system is given by:

$$\omega_1 = (k_1/m_1)^{\frac{1}{2}}$$

In the DD, a mass $m_d$ of the damping system is designed so that the ratio of the mass $m_d$ to the mass $m_1$ of the main vibration system may be set to be or equal to:

$$\mu = m_d/m_1 \geq 0.01.$$

At this time, the natural angular frequency of the damping system is given by:

$$\omega_d = (1/1+\mu)\omega_1$$

A damping coefficient $c_d$ and a damping factor $h_d$ are respectively represented by:

$$c_d = 2m_d\omega_d h_d$$

$$h_d = [3\mu/8(1+\mu)]^{\frac{1}{2}}$$

Active type control devices, or Active Mass Drivers (designated hereinafter as AMD) are disclosed in U.S. Pat. No. 5,022,201.

Prior art FIG. 7 of this application shows a vibration model of an AMD which applies a control force $u(t)$ by an actuator such as a hydraulic or electromagnetic device, between a main body of the structure having a mass $m_1$ and an additional mass body having a mass $m_d$ to actively control the vibration of the structure.

In the AMD, assuming that a spring between the main body of the structure and the additional mass body constituting a vibration control device is set under a soft condition, i.e., $$\omega_d \leq (\tfrac{1}{2})\omega_1$$

the control force $u(t)$ is given in the following equation:

$$u(t) = G_1(dx_1/dt) + G_2(dx_d/dt)$$

wherein $G_1$ is a gain in a circuit including an automatic gain control circuit (AGC) or the like against the response speed of the structure and attains the correspondences of large inputs through small inputs. The second term in the above equation gives a damping property to the side of the additional mass body as well to attain stability thereof by adding the product of a gain $G_2$ (negative sign) to a vibration speed on the side of the additional mass body to the control force.

In response to the above defined AMD, some studies have been made which add a spring having a spring constant $k_d$ in parallel with the control force due to the actuator as shown in the vibration model of FIG. 8 and to obtain a vibration control effect to the same degree with that of the AMD by means of less control force in comparison with that of the AMD (designated hereinafter as ATMD, the abbreviation for Active Tuned Damper.)

In an ATMD, a spring constant $k_d$ is set so that the vibration of an additional mass body may synchronize with that of a structure, that is, $$\omega_d = \omega_1$$

and the resulting control force $u(t)$ is, for example, given by the following equation:

$$u(t) = G_1(dx_1/dt) + G_2(dx_d/dt) + G_3(x_1 - x_d)$$

wherein $G_3$ is a gain having a negative sign and cancels a part of the inertial force applying on the additional mass body at a vibration time due to the third term in the above equation so that the additional mass body may be vibrated by less control force.

Japanese Pat. Publication No. 3-70075 discloses means for controlling the structural vibration due to earthquake or the like by an extremely small control force by connecting a second additional mass body having a mass less than that of the additional mass body of a DD to the additional mass body of the DD through a spring and an actuator and applying a control force to the second additional mass body from the actuator, as it were, an active type vibration control device in a form of a double dynamic damper.

The conventional vibration control device as described above has an advantage in that the DD needs no energy supply to the device, but the vibration control effect is determined by the mass ratio of the structure to the additional mass body. Therefore, the DD needs the additional mass body with a large mass before any significant vibration control can be expected.

The AMD gets a large control effect by using an additional mass body with less mass in comparison with that of the DD. However, since an energy supply is necessary, the design of a control force circuit, provision for security and stability of the device, and the prevention of malfunction are necessary.

As described above, the ATMD has an advantage in that the control force can be lessened in comparison with that of the AMD, but the ATMD has similar disadvantages to those of the AMD. The ATMD can easily produce noise and vibration problems since the device for applying the control force directly produces a reaction force to the structure.

The present invention presents a novel solution for the problems in the above-described conventional vibration control devices.

SUMMARY OF THE INVENTION

The inventive control device includes a first additional mass body and a second additional mass body to provide a double dynamic damper of an active type.

The first additional mass body, having a predetermined mass $m_a$, is mounted on a support body having a predetermined spring constant $k_a$ and a predetermined damping coefficient $c_a$. The first additional mass body and its support body may be mounted on the top portion or other appropriate places on the structure.

Referring to FIG. 4, the second additional mass driver relative to the first additional mass body $m_a$, and body, having a predetermined mass $m_b$, comprises a movable is connected to the first additional mass body through a spring having a predetermined spring constant $k_b$.

When a large-size structure, such as a high rise building, is subjected to vibration control, the mass of the first additional mass body m is equal to about 1/500 through 1/1000 of the mass of the structure. Although the invention is not limited to any particular type of support body, in the preferred embodiment of the an acceptable spring constant $k_a$ and a high damping invention, high damping laminated rubber is used because coefficient $c_a$ are easily obtained. However, a variety of air springs and damping materials are possible, so long as a predetermined spring capacity and damping capacity can. invention, however, the damping coefficient $c_a$ in the be obtained. In the preferred embodiment of the support body, as will be described later in detail, is considerably larger than that in the case of the DD, and the first additional mass body is vibrated by a force received from the driver.

The mass of the driver second additional mass body is preferably 1/20 to 1/100 of the mass of the first additional mass body, and the driver second additional mass body may be actuated, for instance, by an electromagnetic force from a linear motor or by pressure from a hydraulic cylinder. The mass of the driver is not always restricted to the above-defined range, but it is considered that the above-defined range is preferable in connection with the drive mechanism and the resultant vibration control effect.

With reference to the spring force for acting between the driver and the first additional mass body, it is possible to directly use a spring material. However, in the present invention, a surface in the form of a concave circular arc is formed on the first additional mass body to provide a travel surface for the driver. The equivalent of a spring force is thereby obtained to provide a predetermined vibration frequency. In the present invention, the response speed $(dx_1/dt)$ of the structure is fed back.

Since the above-described control frequently feeds back the response acceleration of the structure as a control force applied on the driver, a large vibration control effect can be expected by using the control force represented by, for example, the following equation:

$$u(t) = G_1(d^2x_1/dt^2)G_2(dx_b/dt) + G_3(x_b - x_a) \qquad (1)$$

wherein, $G_1$, $G_2$ or $G_3$ is a predetermined gain in each term of the above equation (1), $(d^2x_1/dt^2)$ is a response acceleration of the structure, $(dx_b/dt)$ is a speed of the first additional mass body, and $(x_b - x_a)$ is a relative displacement of the first additional mass body to the driver.

As for what feeds back the response speed of the structure, a large vibration control effect can be expected by using the control force represented by, for example, the following equation:

$$u(t) = G_1'(dx_1/dt) + G_2'(x_a - x_1) + G_3'(dx_b/dt) + G_4'(x_b x_a) \qquad (3)$$

wherein, $G_1$, $G_2$, $G_3$, or $G_4$ is a predetermined gain in each term of the above equation (3), $(dx_1/dt)$ is a response speed of the structure, $(x_a - x_1)$ is a relative displacement of the first additional mass body to the structure, $(dx_b/dt)$ is a speed of the first additional mass body, and $(x_b - x_a)$ is a relative displacement of the first additional mass body to the driver.

With reference to the control force described above, the further details will be described later in connection with a preferred embodiment of the invention.

OBJECTS OF THE INVENTION

It is therefore among the objects of the present invention to provide a compact vibration control device which provides high reliability and safety; which, unlike the AMD, produces no vibration or noise problems; which is operated by a smaller energy supply and control force than that of an ATMD; and which can effectively restrict the vibration of a structure against an earthquake or the like.

BRIEF DESCRIPTION OF THE DRAWINGS

The foregoing and other objects and features of the invention will become apparent from the following description of the preferred embodiment of the invention with reference to the accompanying drawings, in which.

DESCRIPTION OF THE PREFERRED EMBODIMENT OF THE INVENTION

Figure 1:
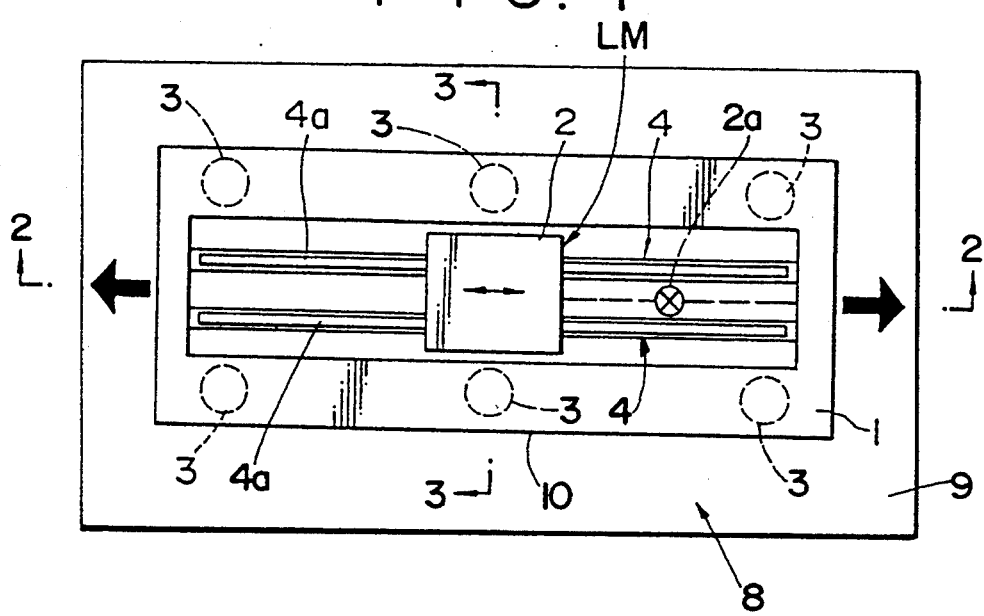
FIG. 1 is a plan view of a preferred embodiment of the invention.
Figure 2:
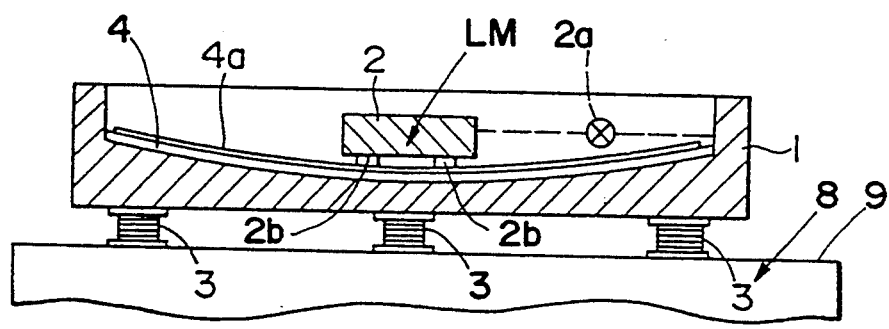
FIG. 2 is a front elevational view in section of the preferred embodiment of the invention taken along the line 2—2 of FIG. 1.
Figure 3:
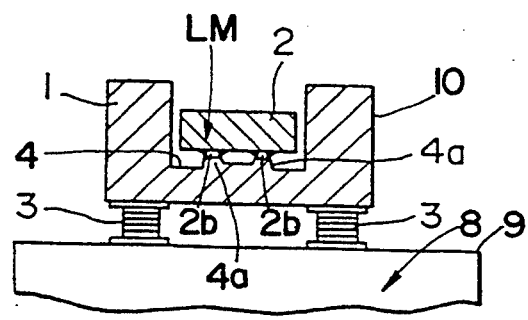
FIG. 3 is a side elevational view in section of the preferred embodiment of the invention taken along the line 3—3 of FIG. 1.

Referring to FIGS. 1 through 3, a first additional mass 1 is made of a steel member used both as an external frame for carrying a driver 2 and for providing a weight of approximately 1/500 to 1/1000 of the total weight of the protected structure 8.

The driver 2, as a second additional mass, has a weight of approximately 1/20 to 1/100 of the weight of the first additional mass 1 and travels on the first additional mass 1 by a driving force from a linear motor LM, or the like, such as the linear motor disclosed in U.S. Pat. No. 5,158,021, wherein the stators 4a of the linear motor of the subject application, FIGS. 1 through 3, are secured to the curved surface 4 of the first additional mass 1, and permanent magnets 2b are secured to the underside of second additional mass driver 2. The stators 4a may serve as parallel tracks to guide movement of the driver 2. The curved surface 4 provides the equivalent of a spring force which may be adjusted by the distance of travel of the driver 2 on the arcuately curved tracks 4a of curved surface 4, adjusted to the natural period of the structure 8.

As shown in phantom, an actuator 2a, such as a hydraulic cylinder or an electro-mechanical device, may be used in lieu of the linear motor LM.

The first additional mass 1 rests on a plurality of evenly distributed high damping laminated rubber supports 3 carried on the surface 9 of the structure 8. In a specific application of the invention, if the total weight of a structure is 100,000 tons or more, the first additional mass 1 would be approximately 100 tons and the driver 2 would be approximately 5 tons. The longer side 10, FIG. 1, of the first additional mass 1 becomes approximately 8 to 10 m and the rubber support dampers 3 are approximately 60 through 70 cm in height with horizontal displacement capacity of 40 to 50 cm. If the primary natural period of the structure 8 is, for example, 5 seconds, the primary period in the first additional mass 1 is set to be approximately 5 seconds with respect to the rubber supports 3. The radius of the curvature of the travel surface 4 is substantially frictionless and may be set to be approximately 6.2 m.

Figure 4:
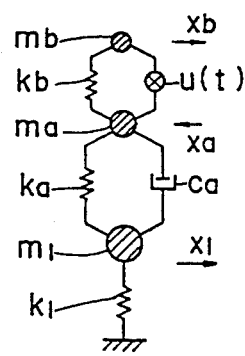
FIG. 4 is a model diagram of a vibration control device of the present invention.

In FIG. 4, $m_1$ represents the mass of a structure constituting a main vibration system, $m_a$ represents the first additional mass of the vibration control device, and $m_b$ represents the driver second additional mass. In addition, $k_1$ is the spring constant for the structure $m_1$, $k_a$ is the spring constant of the rubber supports (not shown), $c_a$ is a damping coefficient of the rubber supports 3, $k_b$ is a spring constant between the first additional mass $m_a$ and the driver second additional mass $m_b$, which is a function of the curvature of the travel surface 4, and $u(t)$ is the control force for the second additional mass $m_b$. Further, $x_1$ represents displacement of the structure mass $m_a$, and $x_b$ represents a displacement of the driver $m_1$, $x_a$ represents a displacement of the first additional second additional mass $m_b$.

By using the parameters in FIG. 4, angular frequencies $\omega_1$, $\omega_a$ and $\omega_b$ of the main vibration system, the first additional mass vibration control device and the driver second additional mass are represented by:

$$\omega_1 = (k_1/m_1)^{\frac{1}{2}}$$

$$\omega_a = (k_a/m_a)^{\frac{1}{2}}$$

$$\omega_b = (k_b/m_b)^{\frac{1}{2}}$$

Then, by synchronizing these angular frequencies, the relation of the following equation is established:

$$\omega_1 \approx \omega_a \approx \omega_b$$

Subsequently, a relationship of the mass of the structure as described above, that of the first additional mass of the vibration control device and that of the driver second additional mass can be represented by:

$$m_a/m_1 = 1/500 \text{ through } 1/1000$$

$$m_b/m_a = 1/10 \text{ through } 1/100$$

Furthermore, a damping coefficient $c_a$ in the first additional mass of the vibration control device can be represented by:

$$c_a = 2m_a\omega_a h_a$$

In the above equation, $h_a$ is a damping factor of the rubber support bodies and a large damping factor of as much as $h_a = 10\%$ to 50% is used in the design of the support bodies.

The control force for controlling the motion of the driver second additional mass in the vibration control device is defined by the following equation:

$$u(t) = G_1(d^2x_1/dt^2) + G_2(dx_b/dt) + G_3(x_b - x_a) \qquad (1)$$

wherein $G_1$, $G_2$ or $G_3$ is gain in each term of the above equation (1).

Energy is mainly exhausted by the damper function (damping coefficient $c_a$) of the rubber support bodies.

Since the angular frequency $\omega_a$ of the first additional mass of the vibration control device is in synchronization with the angular frequency $\omega_1$ of the main vibration system, a dynamic damper is formed. However, the damping coefficient $c_a$ is enlarged so as to be more than enough to meet the optimum design value. No dynamic damper normally acts in this state.

When the control force $u(t)$ is applied and the first additional mass of the vibration control device (mass $m_a$) is vibrated, its lateral movement is far greater than the normal DD (Dynamic Damper), and therefore the vibration control effect is increased.

Even in the case where the response acceleration of the structure constituting the main vibration system is minimal, the gain $G_1$ in the first term of the above equation (1) functions to give a control force in the form of amplifying the response acceleration, and, as a result, the vibration control effect can be increased.

The reaction force of the control force u(t) is treated by using the inertial force of the driver (mass $m_b=1/10$ $m_a$ through $1/00$ $m_a$) loaded on the first additional mass 1 of the vibration control device.

The second term in the above equation (1) is a term for affording a damping property to the driver 1 by using the relationship between the action and the reaction, and therefore stability of the vibration of the driver can be attained. When synchronizing the angular frequency $\omega_a$, of the main body of the vibration control device with the angular frequency $\omega_1$ of the main vibration system, the gain $G_2$ can be represented by:

$$G_2 = 2m_b\omega_1 h$$

and can also be set so that the damping coefficient h may be within the range of 0.1 through 0.2 (10% through 20%).

Additionally, by making use of the principle of the ATMD described above, the angular frequency $\omega_b$ of the driver is kept synchronized with the angular frequency $\omega_1$ of the main vibration system. Then, since the spring force (spring constant $k_b$) absorbs most of the force required for control, even less control force is needed. In other words, the control force [u(t)], the inertial force $[m_b(dx_b/dt)^2]$, and the spring force $[k_b(x_b - x_a)]$ act on the driver and the relation is given by:

$$\text{(Control Force)} + \text{(Inertial Force)} + \text{(Spring Force)} = 0$$

Since the inertial force and the spring force substantially cancel each other in the above equation, the control force needed is minimal.

In this case, a synchronizing angular frequency $$\omega_b'(=[(k_b+G_3)/m_b]^{\frac{1}{2}})$$

created by the gain $G_3$ (a negative value, e.g., approximately $-k_b \times 0.9$ or $-k_b \times 0.8$ being chosen) in the third term of the above equation (1), is set so as to be not more than a half of the angular frequency $m_b$ of the driver.

As a result, a synchronization is created to the period component of, for example, approximately 16 seconds (in the case of $G_3 = -k_b \times 0.9$), in addition to the period component of 5 seconds of the response acceleration of a structure to be used as an input, and it is necessary to provide an appropriate filter to the gain $G_1$ so as to reduce the control force.

Figure 5:
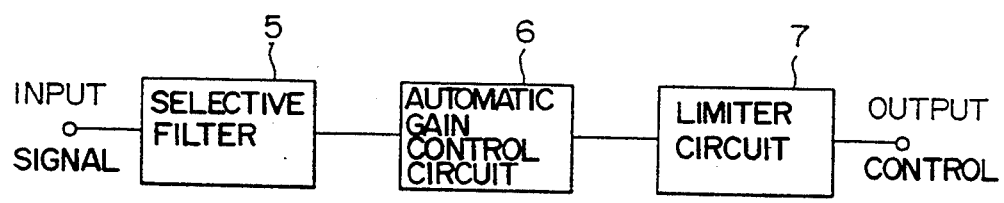
FIG. 5 is a block diagram schematically showing a partial control circuit arrangement comprising a portion of the present invention.
Figure 6:
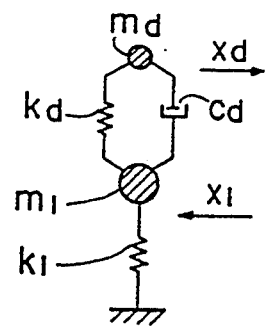
FIG. 6 is a prior art DD vibration model diagram.
Figure 7:
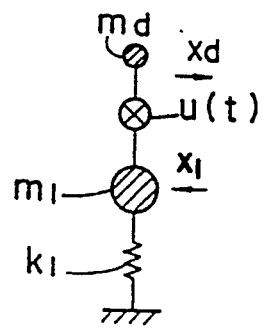
FIG. 7 is a prior art AMD vibration model diagram.
Figure 8:
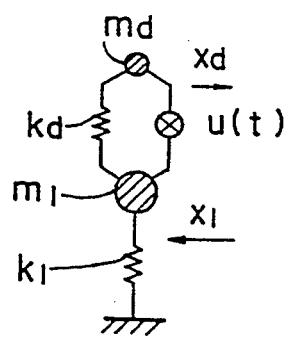
FIG. 8 is a prior art ATMD vibration model diagram.

FIG. 5 is a block diagram showing a part of a control circuit as an embodiment of the present invention and corresponds to the first term in the above equation (1). Any inputs in this case are the response acceleration of the structure to an earthquake, wind or the like, and the amplification by a circuit composed of a filter circuit 5, an AGC circuit 6 and a limiter circuit 7, as shown in FIG. 5.

There is no out-of-phase factor in the vibration frequency in the filter circuit 5. The filter circuit 5 has a sharp characteristic and a transfer characteristic thereof is given by, for example, the following Laplace function:

$$H(s) = (s^2 + 2G\xi_n\omega_n s + \omega_n^2)/(s^2 + 2\xi_n\omega_n s + \omega_n^2) \quad (2)$$

The output multiplied by gain G (e.g., a value multiplied by about 20) is obtained thereby at the objective angular frequency (corresponding to a primary angular frequency of the structure) $\omega_n$, and there is no out-of-phase component at this angular frequency. A damping factor $\xi_n$ takes a value, for example, within the range of 0.2 through 0.5 (20% through 50%). Likewise, the out-of-phase component is not created even in high and low frequency ranges but only created before or after the objective angular frequency. By the use of this filter, the control displacement and the control force required for the above control method are remarkably reduced.

The AGC circuit 6 is normally used for audio circuits or the like, but, by adopting this circuit, vibrations ranging from a large input to a small input can be handled and the vibration control effect can be enhanced.

However, since the AGC circuit 6 alters the amplification factor while the AGC circuit is accompanied by a time delay to some extent, the output is restricted by the limiter circuit 7 so as to prevent any excessive output signals from generating, in particular, during the early stage of vibration.

The control force for controlling the action of the driver second additional mass is not always restricted to the above equation (1), and the control force can also be defined by, for example, the following equation:

$$u(t) = G_1'(dx_1/dt) + G_2'(x_a - x_1) + G_3'(dx_b/dt) + G_4'(s_b x_a) \quad (3)$$

wherein $G_1'$, $G_2'$, $G_3'$ or $G_4'$ is a gain in each term of the above equation (3).

In the case of the above equation (e), the speed $(dx_1/dt)$ of the structure is fed back.

The control described above is applied to any high frequency earthquake or strong wind. For a larger earthquake in excess of the capacity of the device, such a structure as is capable of stopping the drive of the second additional mass body might also be available for preventing damage to the device. Even in this case, the structure may be allowed to function as a passive type dynamic damper, and some vibration control effect as a dynamic damper can be obtained.

Possibility of Industrial Utilization

By installing the vibration control device of the present invention in a structure, the following advantages and effects will be obtained.

1. A large vibration control effect due to the drive of an extremely small mass can be obtained by setting a DD as a basic structure, adding the feature of an ATMD having a driver to this basic structure, and using a control circuit employing a response acceleration as an input thereof.
2. By making effective use of rubber support bodies composed of a passive damping material for the first additional mass of a vibration control device, by substituting a control force for a spring force, and by improving a filter within a control circuit, the control force as well as the amount of energy required for the control can be greatly lessened.
3. Since the first additional mass of the control device is secured to the structure through rubber support bodies with a high damping performance, and the driving portion does not transmit a reaction force directly to the structure body, the problems of noise and vibration from the drive device, which are problems with the conventional AMD, ATMD and the like, are improved.

4. The driver can be installed within the internal portion of the first additional mass of the vibration control device; the first additional mass of the vibration control device is secured to a support with a high damping performance; the mass of the driver is very small in comparison with that of the structure; and the maximum control force is small since the drive device is miniaturized, thereby having no possible influence on the main body of the structure even if the driver accelerates to a speed at which it is out of control.

5. Any vibration controls ranging from large inputs to small inputs become possible by incorporating an AGC circuit or the like in the control circuit.

It will occur to those skilled in the art, upon reading the foregoing description of the preferred embodiments of the invention, taken in conjunction with a study of the drawings, that certain modifications may be made to the invention without departing from the intent or scope of the invention. It is intended, therefore, that the invention be construed and limited only by the appended claims.

We claim:

1. A device to protect a building structure having a natural period of vibration and a load-bearing horizontal surface, from structural damage due to seismic vibration or high wind, comprising: a passive first additional mass having upper, lower, and side surfaces, said upper surface being arcuately concave; passive elastoplastic supports; means to secure said passive elastoplastic supports to said building structure load-bearing horizontal surface; means to mount said passive first additional mass on said passive elastoplastic supports; an active second additional mass, smaller than said passive first additional mass, adapted to be mounted on said passive first additional mass for oscillation on said passive first additional mass arcuately concave upper surface; and actuator means to oscillate said active second additional mass in synchronization with said natural period of vibration of said building structure to attenuate destructive vibration of said building structure.

2. The device of claim 1, including arcuately curved tracks selected to match said arcuately concave upper surface of said first mass and integral thereto, and means to mount said active second mass on said tracks suitable for oscillation thereon.

3. The device of claim 1, wherein said passive elastoplastic supports comprise cylindrical laminated rubber pads having top and bottom ends, said bottom ends being secured to said building structure load-bearing horizontal surface and said top ends being secured to said lower surface of said passive first additional mass.

4. The device of claim 1, wherein said passive elastoplastic supports have a predetermined spring constant and a predetermined coefficient of damping selected to coact with said active second additional mass oscillations to attenuate said building structure vibration.

5. The device of claim 1, wherein the weight of said passive first additional mass is approximately 1/500 to 1/1000 of the weight of said building structure.

6. The device of claim 1, wherein the weight of said active second additional mass is approximately 1/20 to 1/100 of the weight of said passive first additional mass.

7. The device of claim 1, wherein the radius of said passive first additional mass arcuately curved surface is predetermined to provide a period of oscillation of said active second additional mass which approximates the natural period of vibration of said building structure.

8. The device of claim 1, wherein said active second additional mass is oscillated by a linear motor.

9. The device of claim 1, wherein said active second additional mass is oscillated by an electromagnetic force.

10. The device of claim 1, wherein said active second additional mass is oscillated by hydraulic force.

11. The device of claim 1, wherein each of said passive elastoplastic supports is approximately 60 to 70 centimeters in height with a horizontal displacement capacity of approximately 40 to 50 centimeters.

12. The device of claim 1, wherein the radius of curvature of said passive first additional mass arcuately concave upper surface is approximately 6.2 meters.

13. The device of claim 1, wherein said actuator means comprises linear motor stator means aligned longitudinally on and secured to said upper surface of said passive first additional mass; means to energize said linear motor stator means to generate an alternating electromagnetic field of flux; said active second additional mass having an underside; permanent magnet means having a permanent field of flux secured to said underside of said active second additional mass and positioned in said alternating electromagnetic flux field, whereby excitation of said alternating electromagnetic field of flux of said linear motor stator means coacts with said permanent magnet field of flux to oscillate said active second additional mass.

14. The device of claim 13, wherein said linear motor stator means comprise longitudinally parallel first and second linear motor stators, and said permanent magnet means comprise first magnet means positioned over said first linear motor stator and second magnet means positioned over said second linear motor stator.

15. The device of claim 14, wherein said active second additional mass is oscillated by a motor having an arcuately shaped stator, and a motor drive conformed to oscillate on said arcuately shaped stator.

16. The device of claim 15, wherein said active second additional mass is oscillated by a motor comprising first and second horizontally spaced apart arcuately shaped stators, and a motor drive conformed to straddle said arcuately shaped stators and to carry said active second additional mass thereon.

17. The device of claim 16, wherein said first and second horizontally spaced apart arcuately shaped stators function as tracks to transport said active second additional mass thereon.

18. The device of claim 17, wherein said active second additional mass functions as said motor drive.

* * * * *

UNITED STATES PATENT AND TRADEMARK OFFICE
CERTIFICATE OF CORRECTION

PATENT NO. : 5,442,883
DATED : Aug. 22, 1995
INVENTOR(S) : Nishimura et al.

It is certified that error appears in the above-identified patent and that said Letters Patent is hereby corrected as shown below:

Column 3, the paragraph beginning at line 42 and ending at line 58 should read as follows:

When a large-size structure, such as a high rise building, is subjected to vibration control, the mass of the first additional mass body $m_a$ is equal to about 1/500 through 1/1000 of the mass of the structure. Although the invention is not limited to any particular type of support body, in the preferred embodiment of the invention, high damping laminated rubber is used because an acceptable spring constant $k_a$ and a high damping coefficient $c_a$ are easily obtained. However, a variety of air springs and damping materials are possible, so long as a predetermined spring capacity and damping capacity can be obtained. In the preferred embodiment of the invention, however, the damping coefficient $c_a$ in the support body, as will be described later in detail, is considerably larger than that in the case of the DD, and the first additional mass body is vibrated by a force received from the driver.

Signed and Sealed this

Seventh Day of November, 1995

Attest:

BRUCE LEHMAN

Attesting Officer

Commissioner of Patents and Trademarks